(12) United States Patent
Katakura et al.

(10) Patent No.: US 6,199,968 B1
(45) Date of Patent: *Mar. 13, 2001

(54) HIGH SPEED PRINT METHOD FOR INK JET RECORDING APPARATUS AND INK JET RECORDING APPARATUS HAVING HIGH SPEED PRINT MODE

(75) Inventors: Takahiro Katakura; Minoru Usui, both of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,160

(22) Filed: Apr. 4, 1997

(30) Foreign Application Priority Data

Apr. 5, 1996 (JP) .................................................. 8-110383
Mar. 27, 1997 (JP) .................................................. 9-093242

(51) Int. Cl.[7] ...................................................... B41J 29/38
(52) U.S. Cl. ........................................................... 347/9
(58) Field of Search ................................... 347/9, 3, 100, 347/103, 106, 15, 37, 43, 11, 13

(56) References Cited

U.S. PATENT DOCUMENTS

| | | | |
|---|---|---|---|
| 5,146,236 | * 9/1992 | Hirata et al. | 347/15 |
| 5,495,270 | * 2/1996 | Burr et al. | 347/15 |
| 5,604,597 | 2/1997 | Imai | 358/296 |
| 5,633,663 | * 5/1997 | Matsubara et al. | 347/9 |
| 5,900,891 | * 5/1999 | Shimoda | 347/43 |

FOREIGN PATENT DOCUMENTS

| | | | |
|---|---|---|---|
| 0 315 206 | 5/1989 | (EP) | B41J/3/04 |
| 0 513 989 A2 | 11/1992 | (EP) | B41J/2/205 |
| 0 625 761 A2 | 11/1994 | (EP) | G06F/15/62 |
| 6-339008 | 12/1994 | (JP) | |

OTHER PUBLICATIONS

Patent Abstracts of Japan, vol. 013, No. 528, JP 01 216865.
Patent Abstracts of Japan, vol. 013, No. 034, JP 63 233669.
Patent Abstracts of Japan, vol. 014, No. 447, JP 02 178069.
European Search Report.

* cited by examiner

Primary Examiner—John Barlow
Assistant Examiner—Charles W. Stewart, Jr.
(74) Attorney, Agent, or Firm—Sughrue, Mion, Zinn, Macpeak & Seas, PLLC

(57) ABSTRACT

An ink jet recording apparatus achieves increased print speed without reformation of the recording head and without printing quality impairment. The ink jet recording apparatus has a print mode judging means 35 for judging a print mode from an externally applied command, an image developer 32 for developing a single pixel in print data into a plurality of pieces of bit map data and outputting the developed plurality of pieces of bit map data to an image buffer 33, an image reader 34 for thinning the bit map data developed in the image buffer 33 so that at least a single dot is included per pixel and for outputting the thinned data to a recording head 6 when a high speed printing mode has been specified, and a carriage controller 37 for increasing the speed of the carriage to correspond to the thinning operation. Since the dot data includes at least a single dot per pixel, there is no significant impairment of printing quality, and print speed can be increased in proportion to the number of dots reduced.

15 Claims, 6 Drawing Sheets

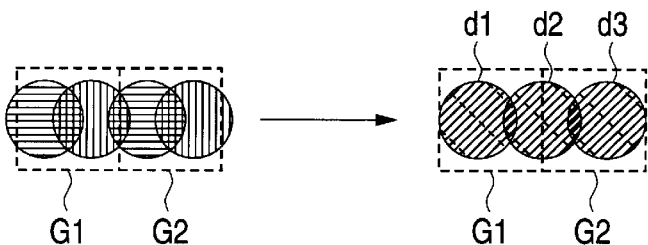
FIG. 5 (a)
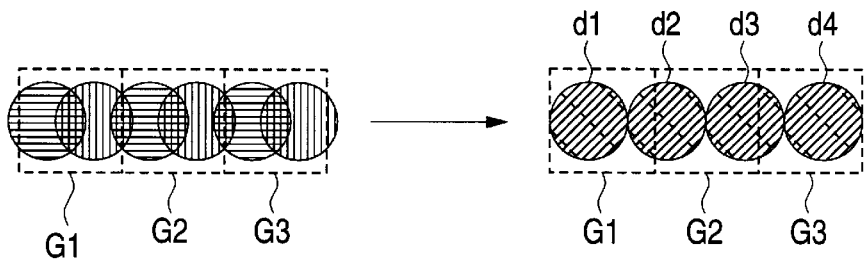
FIG. 5 (b)
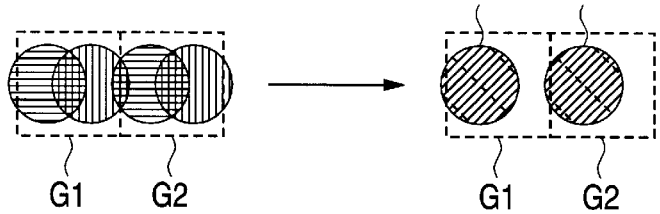
FIG. 5 (c)
FIG. 6 (a)
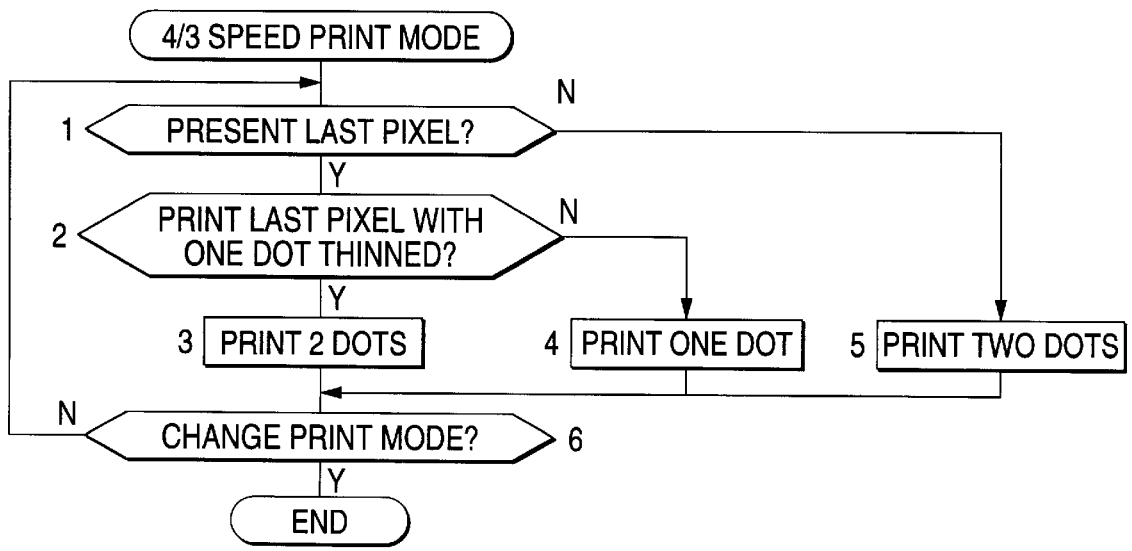

HIGH SPEED PRINT METHOD FOR INK JET RECORDING APPARATUS AND INK JET RECORDING APPARATUS HAVING HIGH SPEED PRINT MODE

BACKGROUND OF THE INVENTION

1. Field of the Invention

The present invention relates to printing technology using ink jet recording apparatuses that print characters and images on a recording medium by jetting ink droplets out of nozzle openings so as to correspond to print data.

2. Discussion of the Related Art

Some ink jet recording apparatuses that carry a recording head using piezoelectric vibrators as actuators can control the size of an ink droplet by controlling the size and timing of a drive signal to be supplied to an actuator. Therefore, high resolution printing can be implemented, and hence these ink jet recording apparatuses are particularly suitable for applications requiring high printing quality.

In processing graphic data, such printing apparatuses have to handle a large volume of data sent from a host, and therefore have their print speed limited by the print data transfer speed and the data processing speed. On the other hand, in processing text data, such printing apparatuses receive a smaller volume of data per unit time, and therefore have their maximum print speed determined by the recording head drive frequency.

Therefore, for increasing the text data print speed, one possible technique is to increase the recording head drive frequency. However, from such a technique arises the problem of elevated cost since the recording head must be reformed.

To overcome this problem, ink jet recording apparatuses may reduce the number of printed dots by thinning pixel data to be printed. However, this brings about the problem of extremely impaired printing quality.

Text data printing quality improves with increasing dot density. However, when the dot density exceeds a certain level, usually 360 dpi or more, the improvement in printing quality practically tops out, providing no remarkable improvement in appearance.

SUMMARY OF THE INVENTION

The present invention has been made in view of the aforementioned circumstances. An object of the present invention is therefore to provide a high speed print method for an ink jet recording apparatus that can implement text data printing at a speed higher than the normal printing performance of the recording head without reforming the recording head or bringing about significant impairment of printing quality.

A second object of the present invention is to provide an ink jet recording apparatus suitable for implementing the aforementioned high speed print method.

To overcome the aforementioned problems associated with the prior art, the present invention is directed to a high speed print method for an ink jet recording apparatus that involves the steps of: developing a single pixel in a print signal into a plurality of pieces of bit map data; thinning a plurality of pieces of bit map data allocated for a single pixel in such a manner that at least a single dot is included; and jetting an ink droplet by increasing a moving speed of a recording head so as to correspond to the thinning operation.

Since dot data that includes at least a single bit per pixel is printed, there is no significant impairment of printing quality, and print speed can be increased in proportion to the number of dots reduced.

BRIEF DESCRIPTION OF THE DRAWINGS

FIGS. 5(a), 5(b), and 5(c) schematically show how data is printed in a high speed print mode by the aforementioned print controller.

DETAILED DESCRIPTION OF THE PREFERRED EMBODIMENT

Details of the present invention will now be described with reference to embodiments shown in the foregoing drawings.

Figure 1:
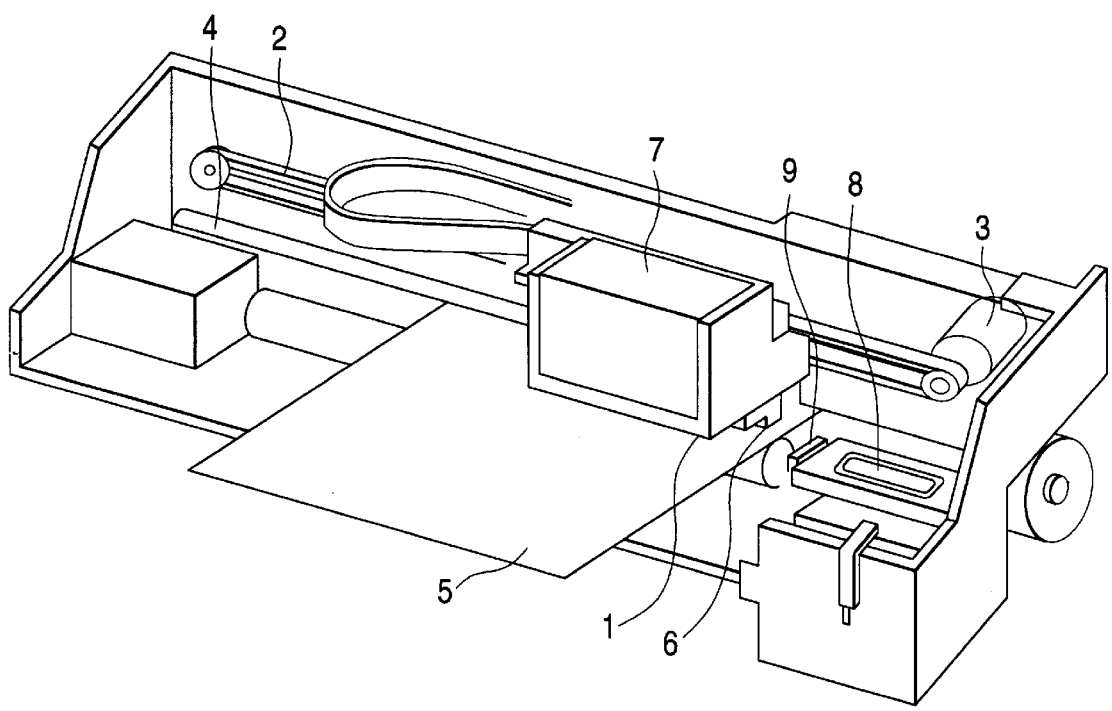
FIG. 1 is a diagram showing an embodiment of the present invention.

FIG. 1 shows an embodiment of the present invention. In FIG. 1, reference numeral 1 denotes a carriage, which is connected to a pulse motor 3 through a timing belt 2 and shuttles across the width of recording paper 5 while guided by a guide member 4.

An ink jet recording head 6, which will be described later, is attached to the carriage 1 on the surface of the carriage 1 that confronts the recording paper 5, i.e., the lower surface. The ink jet recording head 6 prints images and characters on the recording paper 5 by forming a plurality of dots per pixel while receiving ink from an ink cartridge 7 carried on an upper portion of the carriage 1 and jetting ink droplets onto the recording paper 5 in pace with the carriage movement.

Reference numeral 9 denotes a capping device which is arranged on a non-printing region. The capping device 8 not only prevents the nozzle openings of the recording head 6 from drying by sealing the nozzle openings during periods when no printing is taking place, but also functions as a container for receiving ink droplets jetted out of the recording head 6 from a flushing operation that is performed during printing.

Figure 2:
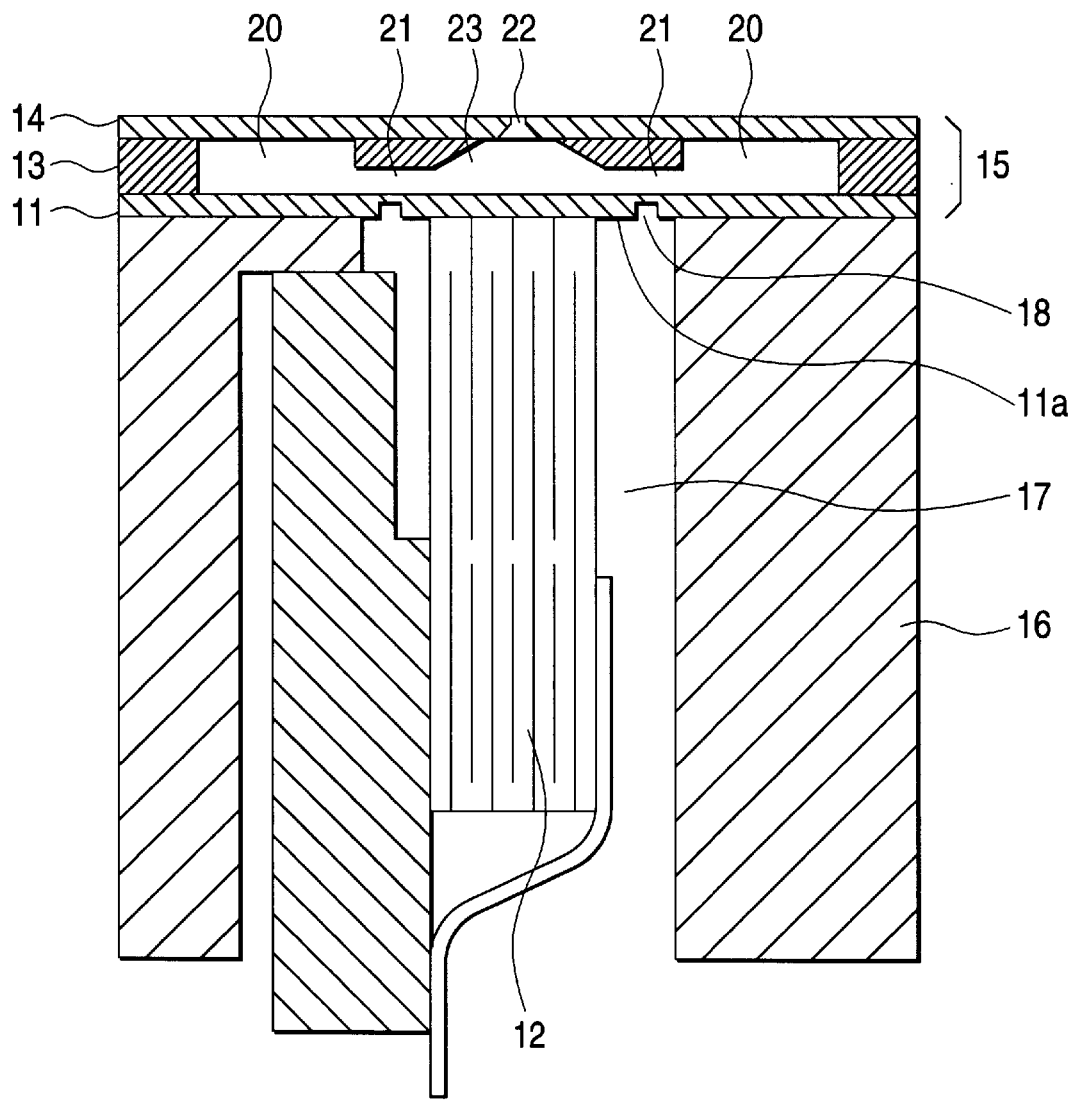
FIG. 2 is diagram showing an embodiment of an ink jet recording head used for the apparatus shown in FIG. 1.

FIG. 2 shows an embodiment of the ink jet recording head. In FIG. 2, reference numeral 11 denotes a vibrating plate, which is a thin plate that is elastically deformed while coming in contact with the tip of a piezoelectric vibrator 12. The vibrating plate 11 is fixed integrally with a nozzle plate 14 while interposing a passage forming plate 13 therebetween so as to be impervious to liquids, whereby a passage unit 15 is constructed.

Reference numeral 16 denotes a base, which includes an accommodating chamber 17 and openings 18. The accommodating chamber 17 accommodates the piezoelectric vibrator 12 so that the piezoelectric vibrator can vibrate therein. The base 16 supports the passage unit 15 with the tip of the piezoelectric vibrator 12 brought into contact with an island portion 11a of the vibrating plate 11.

As a result of this construction, when the piezoelectric vibrator 12 contracts in response to being electrically charged, a corresponding pressure producing chamber 23 expands. Hence, ink within common ink chambers 20, 20 flows into the pressure producing chamber 23 via ink supply ports 21, 21.

When the piezoelectric vibrator 12 returns to the original position in response to being electrically discharged, after a predetermined time has elapsed, the pressure producing chamber 23 contracts and compresses the ink within the pressure producing chamber 23, so that the compressed ink is jetted out of a corresponding nozzle opening 22 in the form of an ink droplet, and the ink droplet forms a dot on the recording paper.

As is well known, a piezoelectric vibrator of a vertical flexural mode, such as that of FIG. 2, contracts in proportion to an applied voltage and, when the applied voltage is eliminated, returns to the original condition, expanding by the amount contracted. In addition, the piezoelectric vibrator 12 has high response. Therefore, by varying the voltage for a drive signal applied to the piezoelectric vibrator 12, the amount of the expansion and contraction of the pressure producing chamber 23 can be adjusted. Hence, not only can a dot having a desired size be formed, but also a plurality of ink droplets can be jetted out within an extremely short period of time.

Figure 3:
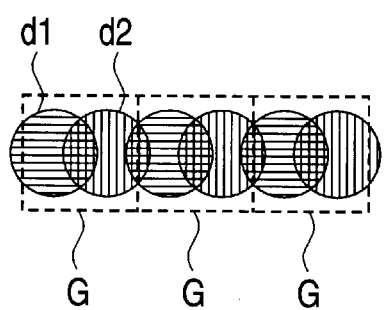
FIG. 3 is a diagram schematically showing a relationship between pixels and dots in an normal print mode in the recording head shown in FIG. 1.

This characteristic can be applied to printing operations that require high resolution, such as the printing of graphics. That is, for such printing, a plurality of dots, e.g., two dots d1, d2 may be allocated per pixel G as shown in FIG. 3.

Figure 4:
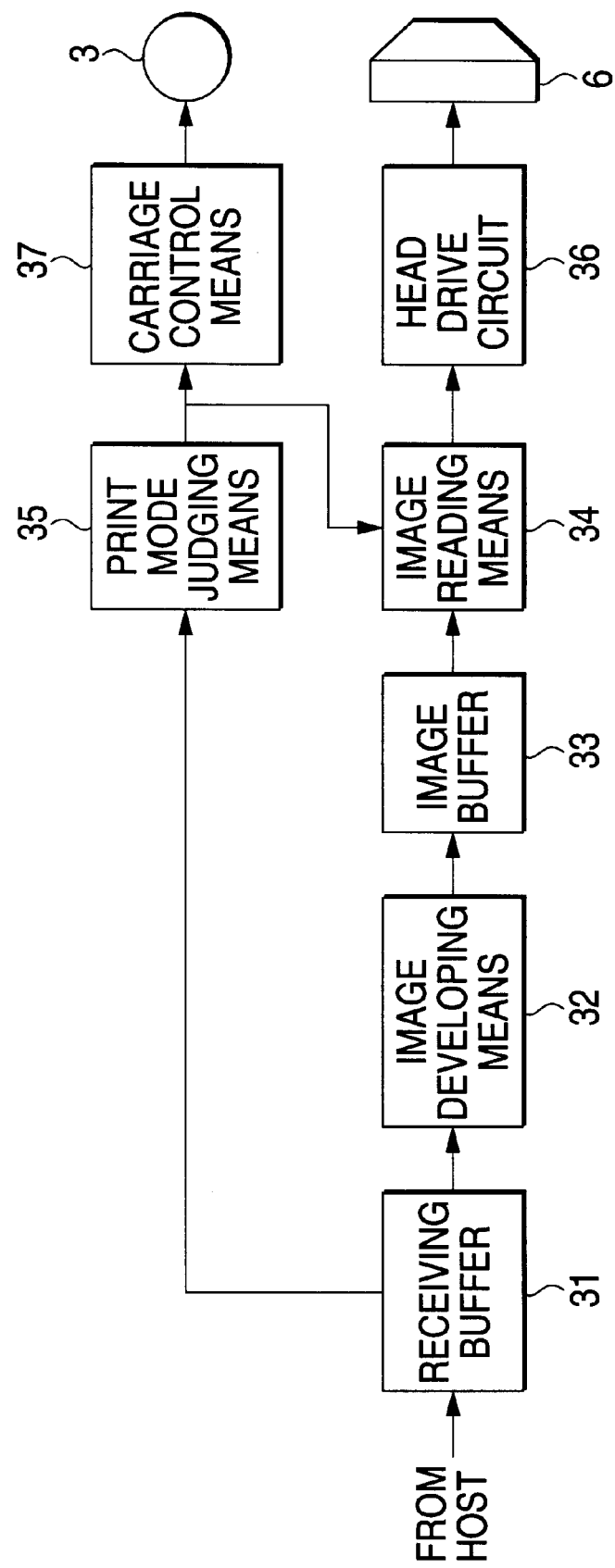
FIG. 4 is a block diagram showing an embodiment of a print controller.

FIG. 4 shows an embodiment of a print controller of the present invention. In FIG. 4, reference numeral 32 denotes an image developer, which develops print data sent from a host and stored in a receiving buffer 31 into bit map data that has a plurality of dots per pixel, e.g., two dote per pixel in this embodiment, and which outputs the developed bit map data to an image buffer 33. The image developer may be referred to as a means for developing pixels to be printed to provide corresponding developed bit map data pieces in an image buffer.

Reference numeral 34 denotes an image reader, which outputs the bit map data as developed in the image buffer 33 to a head drive circuit 36 based on a judgment result made at a print mode judging means 35 that will be described later, and which also outputs the bit map data that is developed in the image buffer 33 to the head drive circuit 36 by thinning, in accordance with a predetermined rule, so that at least a single dot is included per pixel in the bit map data. The image reader may be referred to as a means for reading and thinning developed bit map data pieces to provide thinned data.

Reference numeral 35 denotes the print mode judging means, which judges whether or not print data sent from the host is normal print mode data that requires high resolution printing or is high speed print mode data specifying high speed printing for drafts based on attribute data or the like of the print data, and which outputs the judged print mode to the image reader 34. The print mode judging means may also be referred to as a means for specifying the print mode based on an externally applied command.

Reference numeral 37 denotes a carriage controller, which controls the rotational speed of the carriage drive motor 3, and which moves the carriage 1 at a speed optimized for a selected print mode. The carriage controller may be referred to as a means for increasing the speed of the carriage.

In this embodiment, when print data is delivered from the host to the receiving buffer 31, the image developer 32 develops the print data into bit map data of a plurality of dote per pixel and outputs the developed bit map data to the image buffer 33. When print data that is necessary for printing at least a single line has been developed, the print mode judging means 35 sets the specified print mode based on the attributes of the print data.

If it is judged that the normal print made is specified, the image reader 34 delivers all the bit map data in the image buffer 33 to the head drive means 36 without thinning. Thus, a single pixel of the print data may be printed with two dots by successively jetting two ink droplets out of a single nozzle opening. As a result, the two dots d1, d2 corresponding to the pixel G are formed on the recording paper with their positions slightly shifted from each other in the direction of carriage movement as shown in FIG. 3. Thus, high resolution printing can be implemented.

Figure 6:
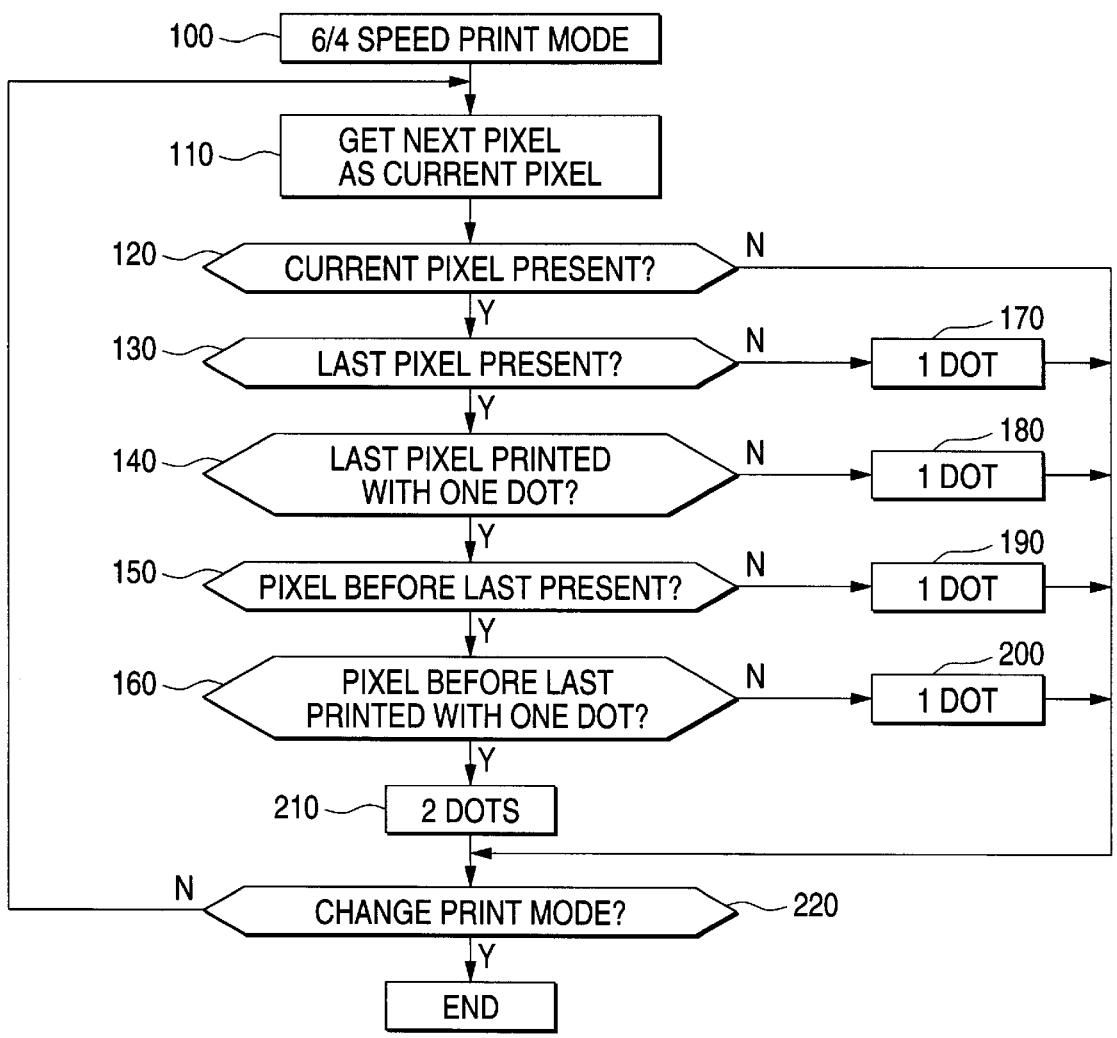
FIGS. 6(a) and 6(b) are flowcharts showing print data generating processes in high speed print modes, in which print speeds are respectively 4/3 times higher and 6/4 times higher than the normal print speed, performed by the aforementioned print controller.

An operation in the high speed print mode will next be described with reference to the flowchart shown in FIG. 6(a). In this example, high speed printing is at a speed which in 4/3 times a normal print speed. The operations depicted in FIG. 6(a) may be referred to as a thinning process or a thinning operation.

When a 4/3 times higher speed printing command (i.e., a request for a 4/3 thinning ratio) has been given from the host or the like, the carriage controller 37, based on a result of judgment of the print mode judging means 35, drives the carriage motor 3 so that the carriage motor rotates at a speed corresponding to the specified print speed, which is a speed 4/3 times higher than the speed of the normal printing in this case.

The image reader 34 then judges whether a pixel to be printed at the specified print timing (i.e., a current pixel) is present based on the pixels in the image buffer 33. Here, a pixel is said to be present when there is bit map data existing in the image buffer that indicates that the current pixel is to be printed. The steps that are carried out when a current pixel is present and when the speed is at 4/3 times higher will now be described with reference to FIG. 6(a).

If a pixel immediately before the current pixel (i.e., the last pixel) is present (FIG. 6(a) Step 1), the image reader 34 judges whether the last pixel has been printed with one dot thinned. If the last pixel has been printed with one dot thinned (FIG. 6(a) Step 2), two dots are printed by the recording head (FIG. 6(a) Step 3) that is moving at the speed of 4/3 times the normal print speed.

If the two dots allocated for the last pixel have both been printed (i.e., path "N" from Step 2), only a single dot is printed (Step 4). Printing the current pixel with only one dot instead of two dots means that the current pixel has been printed with one dot thinned.

On the other hand, if the last pixel is not present (i.e., path "N" from Step 1), two dots are printed (FIG. 6(a), Step 5).

In the case where 4-bit data is present with two pixels G1, G2 successively present, as a result of the foregoing thinning operation, 4-bit data is converted into 3-bit data consisting of d1, d2, d3. The three dots are uniformly printed in a region allocated for the two pixels G1, G2 as shown in FIG. 5(a).

The aforementioned process (FIG. 6(a), Steps 1–5) is repeated until the print mode is changed (Step 6). Of course, as shown in FIG. 4, the image reader does not itself print the dot. Actually, the image reader outputs data to the head drive circuit 36. The data, when produced in accordance with this thinning process, may be referred to as thinned data.

A description will now be given, with reference to FIG. 6(b), an to the logic that may be used to print at a speed 6/4 times higher than normal printing speed.

When a 6/4 times higher speed print command (i.e., a 6/4 thinning ratio) has been given, the 6/4 speed print mode is set in a step 100. At this time, the carriage controller 37, based on a result of judgement of the print mode judging means 35, drives the carriage motor 3 so that the carriage motor rotates at a speed corresponding to the specified print speed, which is a speed 6/4 times higher than the speed of the normal printing in this case.

The image reader 34, based on the developed bit map data, instructs the head drive circuit 35 to print dots as follows. The developed bit map data, i.e., pixels, are analyzed by the image reader 34. In step 110, the next pixel is considered to be the current pixel. If the developed bit map date indicates that the current pixel is to be printed, it is considered present in step 120 and processing continues to step 130. if the pixel is not present, processing continues to step 220.

In step 130, a determination is made as to whether the immediately preceding pixel, i.e., the last pixel, also was present. In other words, it is determined whether the developed bit map data indicated that the last pixel was to be printed. If the last pixel was present, processing continues to step 140. If not, one dot is printed for the current pixel (step 170) and processing continues with step 220. It will be appreciated that the printing of only one dot in step 170 provides a thinned pixel. In the normal print mode, two dots would have been printed. Since only one dot is printed, speed is improved.

In step 140, a determination is made as to whether the last pixel when it was printed, was printed with one dot. The last pixel may have been printed with two dots or one. If the last pixel was printed with one dot, then processing continues to step 150. If the last pixel was not printed with one dot, then one dot is printed for the current pixel (step 180) and processing continues to step 220.

In step 150, a determination is made as to whether a pixel immediately preceding the last pixel (i.e., the pixel before last) was present. If the pixel before last was present (i.e., if the developed bit map data indicated that the pixel before last was to be printed), then processing continues to step 160. If not, then one dot is printed for the current pixel (step 190) and processing continues to step 220.

In step 160, a determination is made as to whether the pixel before last was printed with one dot. The pixel before last may have been printed with two dots or one. If the pixel before last was printed with one dot, then two dots are printed for the current pixel (step 210) and processing continues to step 220. If the pixel before last was not printed with one dot, then one dot is printed for the current pixel (step 200) and processing continues with step 220.

In step 220, a determination is made as to whether the print mode has been changed. If the print mode has been changed, then the processing shown in FIG. 6(*b*) comes to an end. If the print mode has not been changed, then processing continues with step 110 where the next pixel becomes the current pixel.

The aforementioned process is thus repeated until the print mode is changed at step 220.

It will be understood that, by virtue of steps 170, 180, 190, 200 and 210 at least one dot is printed for each pixel that is present (i.e., for each pixel where the developed bit map data indicates that the pixel with only one dot being printed). Steps 170, 180, 190 and 200 provide for the printing of thinned pixels with only one dot being printed.

As a result of the above-described thinning operation 6-bit forming three pixels G1, G2, G3 is converted into 4-bit data consisting of d1, d2, d3, d4 and the four dots are uniformly printed in a region allocated for the three pixels GI, G2, G3 as shown in FIG. 5(*b*).

Clearly, the print speed of a recording apparatus having the ink jet recording head 6 attached thereto depends on the maximum ink droplet jetting frequency of the recording head 6. However, even if the number of dots to be printed per unit length is decreased, the carriage 1 moving speed can be increased without affecting the ink droplet jetting performance of the recording head. That is, if the carriage 1 moving speed is increased to print a smaller number of dots, the ink droplet jetting cycle is increased. Therefore, ink droplets can be jetted satisfactorily. Further, the print speed can be improved by the print tine per pass being reduced only in proportion to the amount of increase in the carriage 1 moving speed. Still further, since at least a single dot is printed per pixel, there is limited degradation in the printing quality in the produced printouts.

Further, ink droplets jetted onto the recording paper by the ink jet recording head 6 are blotted on the recording paper to some degree. Therefore, even if the dot density is slightly decreased compared with the density in high resolution printing printed character patterns are substantially satisfactory in practical terms. Moreover, if the amount of ink in an ink droplet is increased by increasing, compared with the normal print mode, the amount of contraction of the pressure producing chamber while varying a signal to be applied to the piezoelectric vibrator, printing quality in the high speed print mode can be further improved.

Still further, if a single dot is allocated for each of pixels G1, G2 as shown in FIG. 5(*c*) and the carriage 1 moving speed as is increased to twice the normal print speed as in the case where each of the pixels G1, G2 is formed with two dots in the normal print mode, a print mode that is optimized for draft printing, in which one desires to have printouts made within a short period of time, can be implemented although printing quality in such print mode is slightly impaired compared with printing quality in the aforementioned embodiment.

While dot allocation for high speed printing is determined by logic operation in the aforementioned embodiment, it is apparent that similar advantages can be obtained by the following technique. First, dot allocation may be stored in a table in advance per high speed print speed in such a manner that a pattern of bit map data in the image buffer corresponds to a block consisting of a plurality of pixels at the time of high speed printing. Then, thinned out data for optimal high speed printing is read from the table based on both the specified speed in the high speed print mode and the bit map data on the image buffer corresponding to the block consisting of a plurality of pixels.

Figure 7:
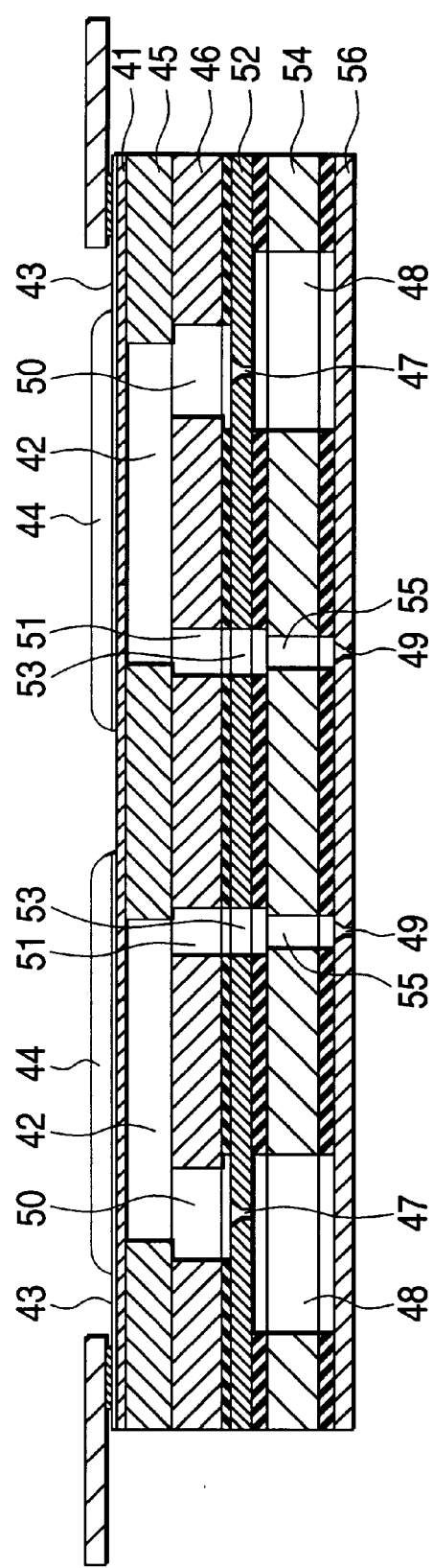
FIG. 7 is a diagram showing another embodiment of an ink jet recording head to which the present invention can be applied.

FIG. 7 shows another embodiment of an ink jet recording head to which the present invention is applicable. In FIG. 7, reference numeral 41 denotes a first cover member that is made of a zirconia thin plate whose thickness is about 9 $\mu$m. Drive electrodes 43, 43 are formed on a surface of the first cover member so as to confront pressure producing chambers 42, 42, and piezoelectric vibrators 44, 44 made of a PZT sheet or film are fixed to the surfaces of the drive electrodes 43, 43.

Reference numeral 45 denotes a spacer, which is formed by boring through holes in a ceramic plate such as a zirconia (zrO2) plate, the ceramic plate having such a suitable thickness as to form the pressure producing chambers 42, 42 therein, such thickness being, e.g., 150 $\mu$m. The pressure producing chambers 42, 42 are formed in the spacer 45 with both surfaces of the spacer 45 sealed by a second cover member 46 (to be described later) and the first cover member 41. As a result of this construction, the pressure producing chambers 42, 42 expand and contract in response to flexural vibration from the piezoelectric vibrators 44, 44, so that the pressure producing chambers 42, 42 can draw ink from common ink chambers 48, 48 through ink supply ports 47, 47 and can cause ink droplets to be jetted out of nozzle openings 49, 49.

Reference numeral 46 denotes the second cover member, which is formed by boring nozzle communicating holes 50, 50 and communicating holes 51, 51 similarly in a ceramic plate such as a zirconia plate or the like. The communicating holes 50, 50 communicate with the ink supply ports 47, 47 at positions close to the outer ends of the pressure producing chambers 42, 42. The communicating holes 51, 51 communicate with the nozzle openings 49, 49 toward the center of the pressure producing chambers 42, 42.

Reference numeral 52 denotes an ink supply port forming board, which is formed by boring nozzle communicating holes 53, 53 and the ink supply ports 47, 47. The nozzle communicating holes 53, 53 are connected to the nozzle openings 49, 49 toward the center of the pressure producing chambers 42, 42. The ink supply ports 47, 47 connect the common ink chambers 48, 48 to the pressure producing chambers 42, 42 toward the outer ends of the pressure producing chambers 42, 42.

Reference numeral 54 denotes a common ink chamber forming board, which is formed by boring through holes that correspond to the shape of the common ink chambers 48, 4.8 and communicating holes 55, 55 that are connected to the nozzle openings 49, 49 outside such through holes. These through holes and communicating holes are formed in a corrosion-resistant plate such as a stainless steel plate having such a suitable thickness as to form the common ink chambers 48, 48, such thickness being, e.g., 150 $\mu$m. Reference numeral 56 denotes a nozzle plate having the above-identified nozzles 49, 49.

A piezoelectric vibrator of flexural vibration mode such as this is driven at a lower speed than a piezoelectric vibrator of vertical vibration mode. However, the drive speed of the piezoelectric vibrator of flexural vibration mode can be significantly improved if the vibrator is formed of a film or the like. Hence, with such an improvement in the drive speed, the present invention can be applied to piezoelectric vibrators of flexural vibration mode as well.

While the print mode is specified from the host in the aforementioned embodiment, mode selection can be made through a selector button that may be arranged on a panel of a recording apparatus if a processing means is arranged in the recording apparatus. Further, while the aforementioned process is executed by the recording apparatus, such a process may be executed by means of print driver software on a host such as a personal computer.

In other words, the invention may be realized in a computer program product comprising a computer-readable medium and computer-readable instructions. Computer readable media include diskettes, tapes, chips, boards, and hard drives, and may further include a transmission system if the computer readable instructions are being downloaded from a distant medium across, e.g., the Internet. Computer readable instructions may include source code in a high level computer language, assembler code, object code, machine code, executable code, or the like. In this sense, the term "program product" is intended to encompass any computer readable medium bearing computer readable instructions.

The computer readable instructions, of course, are for use in instructing a computer to perform the method of the invention. In this sense, the term "computer" may include computer systems characterized as standalone, networked, distributed processing, client-server, and the like. In other words, the print driver software may be manufactured in many specific forms of computer program product, and may be implemented by running the software on many specific forms of computer systems.

As described in the foregoing, the present invention is characterized as involving the steps of: developing a single pixel in a print signal into a plurality of pieces of bit map data; thinning a plurality of pieces of bit map data allocated for a single pixel in such a manner that at least a single dot is included; and jetting an ink droplet by increasing a moving speed of a recording head so as to correspond to the thinning operation. Therefore, the carriage moving speed can be increased and the print speed can hence be improved without reforming the recording head or bringing about impairment of printing quality.

There is claimed:

1. A print method for an ink jet recording apparatus, said method comprising the steps of:

developing a single pixel of a print signal into bit map data pieces;

thinning said bit map data pieces so that at least a single dot is printed for each of a plurality of pixels;

setting a moving speed of a recording head of said ink jet recording apparatus in accordance with said thinning; and jetting an ink droplet from said recording head moving at said set moving speed to produce said dot.

2. The print method according to claim 1, further comprising:

a normal speed print mode comprising the step of jetting said ink droplet with a first amount of ink per droplet to produce said dot; and a high speed print mode comprising the step of jetting said ink droplets with a second amount of ink per droplet, wherein said second amount of ink is greater than said first amount of ink.

3. The print method according to claim 1, wherein said thinning is performed by a logic operation.

4. The print method according to claim 1, wherein said thinning is performed by referencing a table.

5. An ink jet recording apparatus, comprising:

means for specifying a print mode based on an externally applied command, said print mode including a normal print mode and a high speed print mode, wherein said ink jet recording apparatus operates more rapidly in said high speed print mode than in said normal print mode;

a recording head for jetting ink droplets on recording paper, said ink droplets representing pixels, the pixels being included in print data;

a carriage for allowing said recording head to shuttle across said recording paper;

means for developing said pixels to provide corresponding developed bit map data pieces in an image buffer;

means for reading and thinning said developed bit map data pieces to provide thinned data to said recording head in said high speed print mode, said thinned data including at least one dot for each of said pixels; and means for increasing a speed of said carriage based on said thinning operation.

6. The ink jet recording apparatus according to claim 5, wherein when said high speed print mode is specified, an amount of ink in said ink droplets is greater than that of said ink droplets in said normal print mode.

7. The ink jet recording apparatus according to claim 5, wherein said thinning is performed with a logic operation.

8. The ink jet recording apparatus according to claim 5, wherein said thinning is performed with reference to a table.

9. A computer program product, comprising:
   computer readable instructions, and
   a computer readable medium bearing said computer readable instructions;
   wherein said computer readable instructions instruct a computer system with an ink jet recording apparatus to perform;
   developing bit map data pieces based on a print signal identifying pixels, each of said pixels having a plurality of said bit map data pieces;
   in a normal speed print mode, setting a moving speed of a recording head of said ink jet recording apparatus at a normal moving speed, and jetting from said recording head ink droplets on the basis of said bit map data pieces;
   in a high speed print mode, setting said moving speed to a high moving speed that is greater than said normal moving speed, thinning said bit map data pieces at a thinning ratio to provide thinned data which has at least one dot for each of said pixels, and jetting from said recording head said ink droplets on the basis of said thinned data, wherein said high speed is based on said thinning ratio.

10. The computer program product according to claim 9, wherein said thinning is performed according to a logical operation.

11. The computer program product according to claim 9, wherein said thinning is performed with reference to a table.

12. The computer program product according to claim 9, wherein, in said high speed print mode, said ink droplets have a greater per droplet ink amount than in said normal speed print mode.

13. An ink jet recording apparatus, comprising:
   a mode determiner determining whether a print mode of said ink jet recording apparatus is a normal print mode or a high speed print mode, wherein said ink jet recording apparatus operates more rapidly in said high speed print mode than in said normal print mode;
   a recording head selectively placing ink droplets onto recording paper, said ink droplets representing pixels included in print data;
   a carriage moving said recording head across said recording paper;
   a pixel developer providing developed bit map data pieces to an image buffer;
   a thinner reading said bit map data pieces and providing thinned data to said recording head in said high speed print mode based on a thinning operation, wherein said thinned data includes at least one dot for each of said pixels and each dot overlaps an adjacent dot by a variable amount; and
   an accelerator increasing a speed of said carriage based on said thinning operation.

14. A print method for an ink jet recording apparatus, said method comprising the steps of:
   developing each of a plurality of pixels of a print signal into bit map data pieces;
   determining whether a desired mode of said apparatus is a normal mode or a high-speed mode;
   in said normal mode, printing a plurality of dots for each of said plurality of pixels;
   in said high-speed mode, determining a high-speed ratio representing a desired high-speed of said apparatus as compared to a normal-speed in said normal mode and, thinning said bit map data pieces in accordance with said high-speed ratio, and setting a moving speed of a recording head of said ink jet recording apparatus in accordance with said thinning, wherein at least a single dot is printed for each of said plurality of pixels.

15. An ink jet recording apparatus, comprising:
   a mode determiner determining whether a print mode of said ink jet recording apparatus is a normal print mode or a high speed print mode, wherein said ink jet recording apparatus operates more rapidly in said high speed print mode than in said normal print mode;
   a recording head selectively placing ink droplets onto recording paper, said ink droplets representing pixels included in print data;
   a carriage moving said recording head across said recording paper;
   a pixel developer providing developed bit map data pieces to an image buffer;
   a thinner reading said bit map data pieces and providing thinned data to said recording head in said high speed print mode based on a thinning operation, wherein said thinned data includes at least one dot for each of said pixels and each dot overlaps an adjacent dot by a variable amount, said variable amount determined by a ratio representing a desired high speed as compared to a normal speed used in said normal print mode; and
   an accelerator increasing a speed of said carriage based on said thinning operation.

* * * * *